United States Patent
Okuyama et al.

(10) Patent No.: US 8,129,905 B2
(45) Date of Patent: Mar. 6, 2012

(54) PHOSPHOR AND LIGHT EMITTING DEVICE USING THE PHOSPHOR

(75) Inventors: Kojiro Okuyama, Nara (JP); Masahiro Sakai, Kyoto (JP); Seigo Shiraishi, Osaka (JP)

(73) Assignee: Panasonic Corporation, Osaka (JP)

(*) Notice: Subject to any disclaimer, the term of this patent is extended or adjusted under 35 U.S.C. 154(b) by 452 days.

(21) Appl. No.: 12/301,321

(22) PCT Filed: May 25, 2007

(86) PCT No.: PCT/JP2007/060697
§ 371 (c)(1),
(2), (4) Date: Nov. 18, 2008

(87) PCT Pub. No.: WO2007/139014
PCT Pub. Date: Dec. 6, 2007

(65) Prior Publication Data
US 2009/0200945 A1    Aug. 13, 2009

(30) Foreign Application Priority Data
May 26, 2006 (JP) .................. 2006-147080

(51) Int. Cl.
*H01J 17/49* (2012.01)
*C09K 11/54* (2006.01)
*C09K 11/55* (2006.01)
*C09K 11/59* (2006.01)
*C09K 11/78* (2006.01)
*C09K 11/79* (2006.01)

(52) U.S. Cl. .................. 313/582; 313/486; 252/301.4 F
(58) Field of Classification Search .................. 313/486, 313/582; 252/301.4 F
See application file for complete search history.

(56) References Cited

U.S. PATENT DOCUMENTS

| | | | |
|---|---|---|---|
| 4,403,171 A * | 9/1983 | Nakano et al. ................ 313/486 |
| 2003/0085853 A1 | 5/2003 | Shiiki et al. |
| 2004/0239247 A1 | 12/2004 | Kawamura et al. |
| 2005/0156496 A1* | 7/2005 | Takashima et al. ........... 313/237 |
| 2005/0206315 A1* | 9/2005 | Sugimoto et al. ............ 313/582 |
| 2005/0277570 A1* | 12/2005 | Zukawa et al. ............... 510/467 |
| 2006/0049740 A1* | 3/2006 | Hoshino et al. .............. 313/486 |

FOREIGN PATENT DOCUMENTS

| | | |
|---|---|---|
| JP | 1-167394 A | 7/1989 |
| JP | 2003-132803 A | 5/2003 |
| JP | 2003-336048 A | 11/2003 |

* cited by examiner

*Primary Examiner* — Nimeshkumar Patel
*Assistant Examiner* — Steven Horikoshi
(74) *Attorney, Agent, or Firm* — Hamre, Schumann, Mueller & Larson, P.C.

(57) ABSTRACT

The present invention provides a phosphor having high luminance, a property of low luminance degradation during driving of a light-emitting device, and chromaticity y comparable to that of BAM:Eu. The present invention is a phosphor represented by the general formula $aAO \cdot bEuO \cdot DO \cdot cSiO_2$, where A is at least one selected from Ca, Sr and Ba, D is at least one selected from Mg and Zn, and $2.970 \leq a \leq 3.500$, $0.001 \leq b \leq 0.030$, and $1.900 \leq c \leq 2.100$ are satisfied. In this phosphor, a peak intensity at 1490 $cm^{-1}$ is 0.02 to 0.8 when a peak intensity at 565 $cm^{-1}$ is set to 1 in a spectrum obtained by measurement using photoacoustic spectroscopy.

4 Claims, 1 Drawing Sheet

PHOSPHOR AND LIGHT EMITTING DEVICE USING THE PHOSPHOR

TECHNICAL FIELD

The present invention relates to a phosphor that is used in a plasma display panel (PDP), a mercury free fluorescent lamp, or the like, and to a light-emitting device such as a plasma display panel.

BACKGROUND ART

Various aluminate phosphors have been put to practical use as phosphors for energy-saving fluorescent lamps. As a blue phosphor, for example, $(Ba,Sr)MgAl_{10}O_{17}$:Eu is mentioned. As a green phosphor, for example, $CeMgAl_{10}O_{19}$:Tb, $BaMgAl_{10}O_{17}$:Eu,Mn, and the like are mentioned.

In recent years, $(Ba,Sr)MgAl_{10}O_{17}$:Eu, which has high luminance under vacuum-ultraviolet excitation, has been used as a blue phosphor for a plasma display panel.

However, when a PDP, especially one using the blue phosphor $(Ba,Sr)MgAl_{10}O_{17}$:Eu, is driven for a long period, the luminance is degraded significantly. Hence, in the PDP use, there is a strong demand for a phosphor that shows less luminance degradation even after the long-time driving.

In response to this demand, a method using a silicate phosphor has been proposed (see, for example, JP 2003-132803 A).

However, the above-mentioned conventional method has not achieved inhibition of the luminance degradation of the phosphor during PDP driving, while maintaining the high luminance. Moreover, the chromaticity y is higher and the color purity is worse than those of a blue phosphor $(Ba,Sr)MgAl_{10}O_{17}$:Eu (BAM:Eu) that currently is used in the PDP.

DISCLOSURE OF INVENTION

The present invention has achieved a solution to the above conventional problems, and it is an object of the present invention to provide a phosphor having high luminance, a property of low luminance degradation during driving of a light-emitting device, and chromaticity y comparable to that of BAM:Eu. It is a further object of the present invention to provide a long-life light-emitting device using the above phosphor.

The phosphor of the present invention that has solved the above conventional problems is a phosphor represented by the general formula $aAO.bEuO.DO.cSiO_2$, where A is at least one selected from Ca, Sr and Ba, D is at least one selected from Mg and Zn, and $2.970 \leq a \leq 3.500$, $0.001 \leq b \leq 0.030$, and $1.900 \leq c \leq 2.100$ are satisfied. In this phosphor, a peak intensity at 1490 $cm^{-1}$ is 0.02 to 0.8 when a peak intensity at 565 $cm^{-1}$ is set to 1 in a spectrum obtained by measurement using photoacoustic spectroscopy. This peak at 1490 $cm^{-1}$ is derived from the carbon-oxygen double bond. On the surfaces of the phosphor particles of the present invention, chemically stable carbonate groups are present.

Next, the light-emitting device of the present invention is a light-emitting device including a phosphor layer in which the above-mentioned phosphor is used. This light-emitting device is, for example, a PDP, a fluorescent panel, a fluorescent lamp, or the like. It preferably is a PDP.

Lastly, the PDP of the present invention includes: a front panel; a back panel that is arranged to face the front panel; barrier ribs that define the clearance between the front panel and the back panel; a pair of electrodes that are disposed on the back panel or the front panel; an external circuit that is connected to the electrodes; a discharge gas that is present at least between the electrodes and contains xenon that generates a vacuum ultraviolet ray by applying a voltage between the electrodes through the external circuit; and phosphor layers that emit visible light induced by the vacuum ultraviolet ray. The phosphor layers include a blue phosphor layer, and the blue phosphor layer includes the present phosphor.

The phosphor of the present invention has a chromaticity y comparable to that of BAM:Eu and high luminance, and can show low luminance degradation during driving of a light-emitting device such as a PDP. Hence, the use of this phosphor makes it possible to provide a long-life light-emitting device in which the luminance is not degraded even after long-time driving thereof. The light-emitting device of the present invention has blue luminance and chromaticity comparable to or better than those of a light-emitting device using BAM:Eu that is used conventionally. In addition, this light-emitting device has excellent resistance to luminance degradation. Particularly when this light-emitting device is a PDP, it has blue luminance and chromaticity comparable to or better than those of a PDP using BAM:Eu that is used conventionally. In addition, the PDP has excellent resistance to luminance degradation along with image display.

BEST MODE FOR CARRYING OUT THE INVENTION

Figure 1:
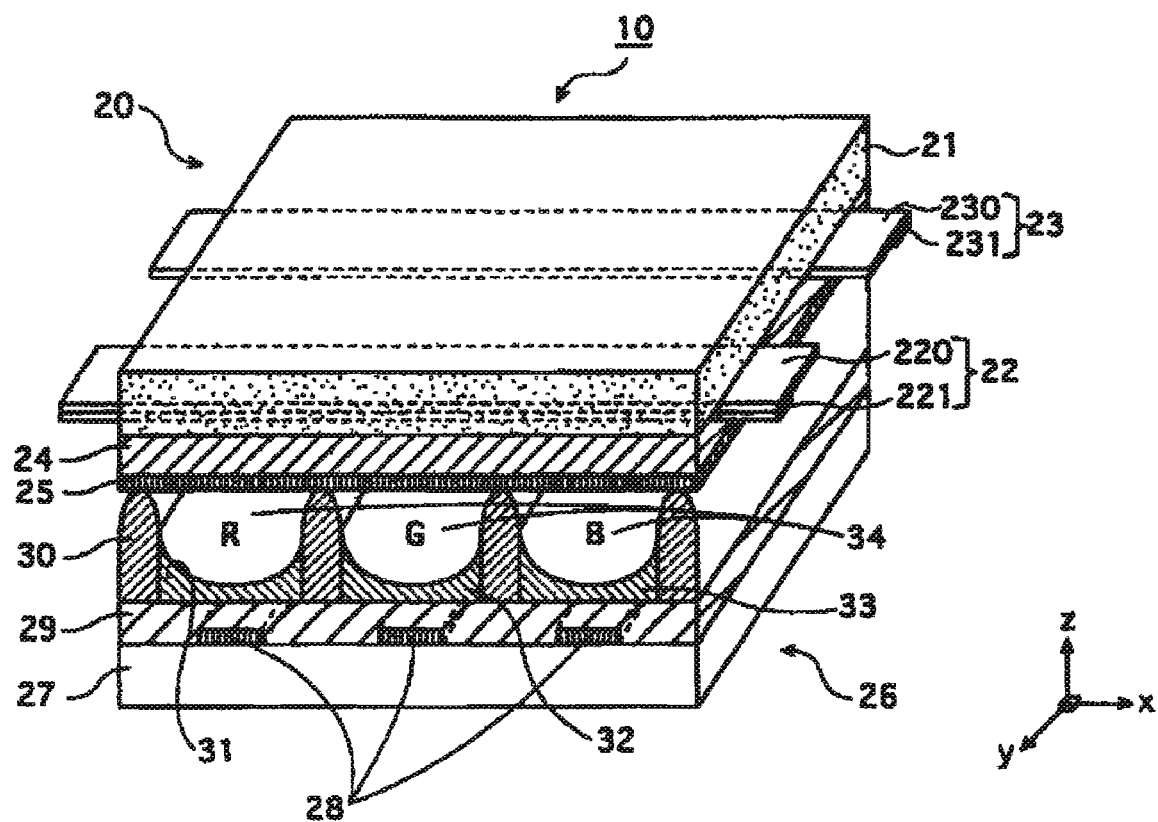
FIG. 1 is a schematic cross-sectional perspective view showing one example of a structure of the PDP of the present invention.

Hereinafter, embodiments of the present invention will be described in detail.

The phosphor of the present invention is represented by the general formula $aAO.bEuO.DO.cSiO_2$. Here, A is at least one selected from Ca, Sr and Ba, and D is at least one selected from Mg and Zn. A preferably is Ca and Sr, and D preferably is Mg. As for the values of a, b and c, they preferably are $2.970 \leq a \leq 3.500$, $0.001 \leq b \leq 0.030$, and $1.900 \leq c \leq 2.100$.

In the phosphor of the present invention, a peak intensity at 1490 $cm^{-1}$ is 0.02 to 0.8 when a peak intensity at 565 $cm^{-1}$ is set to 1 in the spectrum obtained by measurement using photoacoustic spectroscopy.

This peak at 1490 $cm^{-1}$ is derived from the carbon-oxygen double bond. On the surfaces of the phosphor particles of the present invention, chemically stable carbonate groups are present. It is presumed that these carbonate groups contribute to the improvement of the luminance, chromaticity and luminance retaining rate of the phosphor.

In the present invention, the measurement using photoacoustic spectroscopy may be carried out, for example, with an IR-PAS apparatus and using graphite as a blank. The spectrum of each sample obtained from the measurement is subjected to baseline correction by defining a spectral intensity at 2200 $cm^{-1}$ as 0. Next, a peak intensity of a sharp peak whose top is at 565 $cm^{-1}$ is set to 1, and then a peak intensity at 1490 $cm^{-1}$ is read off from the baseline-corrected spectrum (in other words, a ratio represented by (a peak intensity at 1490 $cm^{-1}$/a peak intensity at 565 $cm^{-1}$) may be determined).

Hereinafter, the method of manufacturing the phosphor of the present invention will be described below. The method of manufacturing the phosphor of the present invention is not limited to the method described below.

As a strontium source material for the phosphor of the present invention, a strontium compound that can be converted into strontium oxide by firing, such as strontium hydroxide, strontium carbonate, strontium nitrate, strontium halide, and strontium oxalate, each having high purity (purity of 99% or more), may be used. Strontium oxide having high purity (purity of 99% or more) also may be used.

As a calcium source material, a calcium compound that can be converted into calcium oxide by firing, such as calcium hydroxide, calcium carbonate, calcium nitrate, calcium halide, and calcium oxalate, each having high purity (purity of 99% or more), may be used. Calcium oxide having high purity (purity of 99% or more) also may be used.

As a barium source material, a barium compound that can be converted into barium oxide by firing, such as barium hydroxide, barium carbonate, barium nitrate, barium halide, and barium oxalate, each having high purity (purity of 99% or more), may be used. Barium oxide having high purity (purity of 99% or more) also may be used.

As a magnesium source material, a magnesium compound that can be converted into magnesium oxide by firing, such as magnesium hydroxide, magnesium carbonate, magnesium nitrate, magnesium halide, magnesium oxalate, and basic magnesium carbonate, each having high purity (purity of 99% or more), may be used. Magnesium oxide having high purity (purity of 99% or more) also may be used.

As a europium source material, a europium compound that can be converted into europium oxide by firing, such as europium hydroxide, europium carbonate, europium nitrate, europium halide, and europium oxalate, each having high purity (purity of 99% or more), may be used. Europium oxide having high purity (purity of 99% or more) also may be used.

As a zinc source material and a silicon source material, various source materials that can be converted into oxides or oxide source materials may be used respectively in the same way.

The method for mixing the source materials may be wet mixing in a solution or dry mixing of dry powders. A ball mill, a stirred media mill, a planetary mill, a vibration mill, a jet mill, a V-type mixer, an agitator, and the like, which are in general industrial use, may be used.

Next, the mixed powder is subjected to firing. Here, in order to control the peak intensity at 1490 $cm^{-1}$ to within a range of 0.02 to 0.8 when a peak intensity at 565 $cm^{-1}$ is set to 1 in the spectrum of the phosphor obtained by the measurement using photoacoustic spectroscopy, firing is carried out, for example, in a mixed gas atmosphere containing carbon dioxide (e.g., a mixed gas of nitrogen and carbon dioxide) at 700 to 1200° C. In this case, the ratio between the peak intensity at 1490 $cm^{-1}$ and the peak intensity at 565 $cm^{-1}$ can be controlled by varying the ratio of carbon dioxide in the mixed gas and the temperature of the firing.

The mixed powder may be fired once in a mixed gas atmosphere containing nitrogen and hydrogen at 1100 to 1300° C. before it is subjected to firing in the mixed gas atmosphere containing carbon dioxide.

When a hydroxide, a carbonate, a nitrate, a halide, an oxalate, or the like that can be converted into oxide by firing is used as a source material, it is preferable that such a source material is subjected to pre-firing in an atmosphere containing oxygen such as an air atmosphere within a temperature range of 800 to 1250° C. before main firing.

As a furnace to be used for the firing, furnaces that are in general industrial use may be used. A gas furnace or an electric furnace of the batch type or continuous type such as a pusher furnace may be used.

The particle size distribution and flowability of the phosphor powder can be adjusted by crushing the obtained phosphor powder again using a ball mill, a jet mill, or the like, and further by washing or classifying it, if necessary.

A light-emitting device having good luminance, chromaticity and luminance retaining rate can be constructed by applying the phosphor of the present invention to a light-emitting device having a phosphor layer. Specifically, for a light-emitting device having a phosphor layer in which BAM:Eu is used, all or part of BAM:Eu is replaced with the phosphor of the present invention, while a light-emitting device may be constructed according to a known method. Examples of the light-emitting device include a plasma display panel, a fluorescent panel, and a fluorescent lamp, and among them, a plasma display panel is suitable.

Hereinafter, an embodiment in which the phosphor of the present invention is applied to a PDP will be described with an example of an AC surface-discharge type PDP. FIG. 1 is a cross-sectional perspective view showing a principal structure of an AC surface-discharge type PDP 10. It should be noted that the PDP shown here is illustrated for convenience' sake with a size that is appropriate for a specification of 1024×768 pixels, which is 42-inch class, and the present invention may be applied to other sizes and specifications as well.

As illustrated in FIG. 1, this PDP 10 includes a front panel 20 and a back panel 26, and these panels are arranged with their main surfaces facing each other.

The front panel 20 includes a front panel glass 21 as a front substrate, strip-shaped display electrodes (X-electrode 23, Y-electrode 22) provided on one main surface of the front panel glass 21, a front-side dielectric layer 24 having a thickness of about 30 μm covering the display electrodes, and a protective layer 25 having a thickness of about 1.0 μm provided on the front-side dielectric layer 24.

The above display electrode includes a strip-shaped transparent electrode 220 (230) having a thickness of 0.1 μm and a width of 150 μm, and a bus line 221 (231) having a thickness of 7 μm and a width of 95 μm and laid on the transparent electrode. A plurality of pairs of the display electrodes are disposed in the y-axis direction, where the x-axis direction is a longitudinal direction.

Each pair of display electrodes (X-electrode 23, Y-electrode 22) is connected electrically to a panel drive circuit (not shown) in the vicinity of the ends of the width direction (y-axis direction) of the front panel glass 21. It should be noted that the Y-electrodes 22 are connected collectively to the panel drive circuit and the X-electrodes 23 each are connected independently to the panel drive circuit. When the Y-electrodes 22 and the certain X-electrodes 23 are fed using the panel drive circuit, a surface discharge (sustained discharge) is generated in the gap (approximately 80 μm) between the X-electrode 23 and the Y-electrode 22. The X-electrode 23 also can operate as a scan electrode, and in this case, a write discharge (address discharge) can be generated between the X-electrode 23 and an address electrode 28 to be described later.

The above-mentioned back panel 26 includes a back panel glass 27 as a back substrate, a plurality of address electrodes 28, a back-side dielectric layer 29, barrier ribs 30, and phosphor layers 31 to 33, each of which corresponds to one color of red (R), green (G), and blue (B). The phosphor layers 31 to 33 are provided so that they contact with side walls of two adjacent barrier ribs 30 and with the back-side dielectric layer 29 between the adjacent barrier ribs 30, and repeatedly disposed in sequence in the x-axis direction.

The blue phosphor layer (B) contains the above-mentioned silicate phosphor of the present invention. It should be noted that the phosphor of the present invention may be used alone or used as a mixture with a known phosphor such as BAM:Eu. On the other hand, the red phosphor layer and the green phosphor layer contain commonly-used phosphors. Examples of a red phosphor include $(Y,Gd)BO_3$:Eu and $Y_2O_3$:Eu, and examples of a green phosphor include $Zn_2SiO_4$:Mn, $YBO_3$:Tb, and $(Y,Gd)BO_3$:Tb.

Each phosphor layer can be formed by applying a phosphor ink in which phosphor particles are dissolved to the barrier ribs 30 and the back-side dielectric layer 29 by a known applying method such as a meniscus method and a line jet method, and drying and firing them (e.g., at 500° C., for 10 minutes). The above-mentioned phosphor ink can be prepared, for example, by mixing 30% by mass of the blue phosphor having a volume average particle diameter of 2 μm, 4.5% by mass of ethyl cellulose with a weight average molecular weight of about 200,000, and 65.5% by mass of butyl carbitol acetate. In this regard, it is preferable that the viscosity thereof is adjusted eventually to about 2000 to 6000 cps (2 to 6 Pas), because the adherence of the ink to the barrier ribs 30 can be enhanced.

The address electrodes 28 are provided on the one main surface of the back panel glass 27. The back-side dielectric layer 29 is provided so as to cover the address electrodes 28. The barrier ribs 30 have a height of about 150 μm and a width of about 40 μm, and the longitudinal direction is in the y-axis direction. The barrier ribs 30 are provided on the back-side dielectric layer 29 so as to correspond to the pitch of the adjacent address electrodes 28.

Each of the address electrodes 28 has a thickness of 5 μm and a width of 60 μm. A plurality of address electrodes 28 are disposed in the x-axis direction, where the y-axis direction is a longitudinal direction. The address electrodes 28 are disposed at a certain pitch (about 150 μm). A plurality of address electrodes 28 each are connected independently to the above-mentioned panel drive circuit. Address discharge can be generated between a certain address electrode 28 and a certain X-electrode 23 by feeding each address electrode individually.

The front panel 20 and the back panel 26 are disposed so that the address electrode 28 and the display electrode are orthogonal to each other. The peripheral portions of both the panels 20 and 26 are bonded and sealed with a frit glass sealing portion (not shown) that serves as a sealing member.

An enclosed space between the front panel 20 and the back panel 26, which has been bonded and sealed with the frit glass sealing portion, is filled with a discharge gas composed of a rare gas such as He, Xe and Ne at a predetermined pressure (ordinarily about $6.7 \times 10^4$ to $1.0 \times 10^5$ Pa).

It should be noted that a space corresponding to a space between two adjacent barrier ribs 30 is a discharge space 34. A region where a pair of display electrodes and one address electrode 28 intersect with the discharge space 34 in between corresponds to a cell used for displaying images. It should be noted that in this embodiment, the cell pitch in the x-axis direction is set to approximately 300 μm and the cell pitch in the y-axis direction is set to approximately 675 μm.

When the PDP 10 is driven, a sustained discharge is generated by applying a pulse to between a pair of the display electrodes (X-electrode 23, Y-electrode 22) after an address discharge is generated by applying a pulse voltage to the certain address electrode 28 and the certain X-electrode 23 by the panel drive circuit. The phosphors contained in the phosphor layers 31 to 33 are allowed to emit visible light using the ultraviolet ray with a short wavelength (a resonance line with a central wavelength of about 147 nm and a molecular beam with a central wavelength of 172 nm) thus generated. Thereby, a prescribed image can be displayed on the front panel side.

The phosphor of the present invention can be applied to a fluorescent panel including a fluorescent layer that is excited by an ultraviolet ray and then emits light according to a known manner. This fluorescent panel has higher luminance and excellent resistance to luminance degradation compared to the conventional fluorescent panels. This fluorescent panel can be used, for example, as a backlight of a liquid crystal display device.

The phosphor of the present invention can be applied also to a fluorescent lamp (e.g., an electrodeless fluorescent lamp, etc.) according to a known manner. This fluorescent lamp has higher luminance and excellent resistance to luminance degradation compared to the conventional fluorescent lamps.

Hereinafter, the phosphor of the present invention will be described in detail by Examples.

As starting materials, $SrCO_3$, $BaCO_3$, $CaCO_3$, $Eu_2O_3$, MgO, ZnO, and $SiO_2$ were used. These materials were weighed according to the predetermined composition, and wet-mixed in pure water using a ball mill.

The resulting mixture was dried at 150° C. for 10 hours and the dried powder was fired in an air atmosphere at 1100° C. for 4 hours. The resulting pre-fired product was fired in a mixed gas atmosphere of nitrogen and hydrogen at 1100 to 1300° C. for 4 hours, and thus a phosphor was obtained. The sample phosphor of each Example further was subjected to heat treatment in a mixed gas atmosphere of nitrogen and carbon dioxide at 700 to 1200° C. for 1 hour. Here, the ratio of the peak intensity at 1490 $cm^{-1}$ to the peak intensity at 565 $cm^{-1}$ in the spectrum obtained by measurement using photoacoustic spectroscopy was controlled by varying the ratio between nitrogen and carbon dioxide in the mixed gas and the temperature of the heat treatment.

For the measurement of the obtained phosphor by photoacoustic spectroscopy (PAS), an IR-PAS apparatus (IR instrument: FTS-55A manufactured by VARIAN; PAS instrument and amplifier: MODEL 200 manufactured by MTEC) was used. After a blank measurement was carried out using graphite, the measurement of each sample phosphor was carried out. The spectrum of the sample phosphor obtained by the measurement was subjected to baseline correction by defining a spectral intensity at 2200 $cm^{-1}$ as 0. Then, a peak intensity at 1490 $cm^{-1}$ (a peak derived from the carbon-oxygen double bond) obtained when a peak intensity of a sharp peak whose top is at 565 $cm^{-1}$ is set to 1 was evaluated.

The peak intensities at 1490 $cm^{-1}$ obtained when the peak intensity at 565 $cm^{-1}$ is set to 1 were: 0.02 in the Example where the heat treatment was carried out in an atmosphere of carbon dioxide at a concentration of 5% at 600° C., and 0.8 in the Example where the heat treatment was carried out in an atmosphere of carbon dioxide at a concentration of 20% at 800° C.

The compositions and peak intensities at 1490 $cm^{-1}$ of the phosphors thus obtained, as well as the emission intensities Y/y and chromaticities y measured by irradiating the sample phosphors with a vacuum ultraviolet ray at a wavelength of 146 nm, are shown in Table 1. In this regard, Y and y are luminance Y and chromaticity y in the XYZ color coordinate system of International Commission on Illumination, and Y/y is a value relative to the standard sample ($BaMgAl_{10}O_{17}$:Eu). It should be noted that the sample numbers for Comparative Examples are marked with an asterisk, while the sample numbers for Examples are not marked with an asterisk in Table 1.

TABLE 1

| Sample number | A | D | a | b | c | Peak intensity at 1490 cm$^{-1}$ | Y/y (%) | y |
|---|---|---|---|---|---|---|---|---|
| *1 | Sr | Mg | 2.900 | 0.100 | 2.000 | 0.01 | 42 | 0.120 |
| *2 | Sr | Mg | 2.900 | 0.100 | 2.000 | 0.90 | 25 | 0.160 |
| 3 | Sr | Mg | 2.970 | 0.030 | 2.000 | 0.80 | 93 | 0.065 |
| 4 | Sr | Mg | 3.500 | 0.001 | 2.000 | 0.50 | 100 | 0.052 |
| 5 | Sr | Mg | 3.000 | 0.009 | 1.900 | 0.42 | 102 | 0.055 |
| 6 | Sr | Mg | 2.997 | 0.003 | 2.100 | 0.02 | 100 | 0.051 |
| 7 | Sr | Mg | 2.991 | 0.009 | 2.000 | 0.35 | 112 | 0.053 |
| 8 | Sr | Mg | 3.000 | 0.006 | 2.000 | 0.12 | 100 | 0.055 |
| 9 | Sr | Mg | 3.100 | 0.003 | 2.000 | 0.05 | 96 | 0.056 |
| 10 | Sr | Mg | 2.985 | 0.015 | 2.000 | 0.33 | 118 | 0.058 |
| 11 | Sr | Mg | 2.988 | 0.012 | 2.000 | 0.23 | 120 | 0.060 |
| 12 | $Sr_{0.95}Ca_{0.05}$ | Mg | 2.985 | 0.015 | 2.000 | 0.33 | 118 | 0.058 |
| 13 | $Sr_{0.99}Ca_{0.01}$ | Mg | 2.985 | 0.015 | 2.000 | 0.20 | 122 | 0.060 |
| 14 | $Sr_{0.95}Ba_{0.05}$ | Mg | 2.985 | 0.015 | 2.000 | 0.42 | 95 | 0.051 |
| 15 | $Sr_{0.99}Ba_{0.01}$ | Mg | 2.985 | 0.015 | 2.000 | 0.15 | 105 | 0.055 |
| 16 | Sr | $Mg_{0.9}Zn_{0.1}$ | 2.985 | 0.015 | 2.000 | 0.21 | 112 | 0.058 |
| 17 | Sr | $Mg_{0.8}Zn_{0.2}$ | 2.985 | 0.015 | 2.000 | 0.12 | 122 | 0.058 |
| Standard sample | | $Ba_{0.9}MgAl_{10}O_{17}:Eu_{0.1}$ | | | | 0 | 100 | 0.055 |

As is clear from Table 1, the phosphor of the present invention has high luminance under vacuum-ultraviolet excitation and chromaticity y comparable to that of BAM:Eu.

PDPs (42 inches) having the structure of FIG. 1 were manufactured according to the construction of the above-described embodiment of an AC surface-discharge type PDP, using the same blue phosphors as those of the sample numbers 1 and 10 to 13 in the above examples of manufacture of phosphors, and their luminance retaining rates were evaluated. The luminance retaining rates (i.e., the rates of the luminance Y values after the driving with respect to the initial luminance Y value) after accelerated driving (equivalent to 3000 hours driving) are shown in Table 2. The panels displayed a fixed image with one color of blue. It should be noted that the sample number for Comparative Example is marked with an asterisk, while the sample numbers for Examples are not marked with an asterisk in Table 2.

TABLE 2

| Sample number | A | D | a | b | c | Peak intensity at 1490 cm$^{-1}$ | Luminance retaining rate (%) |
|---|---|---|---|---|---|---|---|
| *18 | Sr | Mg | 2.900 | 0.100 | 2.000 | 0.01 | 90 |
| 19 | Sr | Mg | 2.985 | 0.015 | 2.000 | 0.33 | 100 |
| 20 | Sr | Mg | 2.988 | 0.012 | 2.000 | 0.23 | 97 |
| 21 | $Sr_{0.95}Ca_{0.05}$ | Mg | 2.985 | 0.015 | 2.000 | 0.33 | 100 |
| 22 | $Sr_{0.99}Ca_{0.01}$ | Mg | 2.985 | 0.015 | 2.000 | 0.20 | 100 |
| Standard sample | | $Ba_{0.9}MgAl_{10}O_{17}:Eu_{0.1}$ | | | | 0 | 79 |

As is clear from Table 2, it is confirmed that the luminance degradation was inhibited significantly in the cases where the phosphor of the present invention was used. In contrast, significant luminance degradation during PDP driving was observed in the sample phosphors of Comparative Examples.

INDUSTRIAL APPLICABILITY

The use of the phosphor of the present invention makes it possible to provide a long-life plasma display panel having high luminance, high color purity, and a property of low luminance degradation during the driving thereof. The phosphor of the present invention can be applied to applications such as an electrodeless fluorescent lamp and a fluorescent panel to be used as a backlight of a liquid crystal display device and the like.

The invention claimed is:

1. A phosphor represented by the general formula aAO.bEuO.DO.cSiO$_2$, where A is at least one selected from Ca, Sr and Ba, D is at least one selected from Mg and Zn, and $2.970 \leq a \leq 3.500$, $0.001 \leq b \leq 0.030$, and $1.900 \leq c \leq 2.100$ are satisfied,
   wherein a peak intensity at 1490 cm$^{-1}$ is 0.02 to 0.8 when a peak intensity at 565 cm$^{-1}$ is set to 1 in a spectrum obtained by measurement using photoacoustic spectroscopy,
   the phosphor being obtained by firing a mixed powder of source materials in a mixed gas atmosphere containing nitrogen and hydrogen at 1100 to 1300° C., and then firing in a mixed gas atmosphere containing carbon dioxide at 700 to 1200° C.

2. A light-emitting device, comprising a phosphor layer in which the phosphor according to claim 1 is used.

3. The light-emitting device according to claim 2, which is a plasma display panel.

4. The light-emitting device according to claim 3, wherein the plasma display panel comprises:
   a front panel;
   a back panel that is arranged to face the front panel;
   barrier ribs that define the clearance between the front panel and the back panel;
   a pair of electrodes that are disposed on the back panel or the front panel;
   an external circuit that is connected to the electrodes;
   a discharge gas that is present at least between the electrodes and contains xenon that generates a vacuum ultraviolet ray by applying a voltage between the electrodes through the external circuit; and
   phosphor layers that emit visible light induced by the vacuum ultraviolet ray,
   the phosphor layers include a blue phosphor layer, and the blue phosphor layer includes the phosphor.

* * * * *

UNITED STATES PATENT AND TRADEMARK OFFICE
CERTIFICATE OF CORRECTION

PATENT NO.         : 8,129,905 B2                                    Page 1 of 1
APPLICATION NO.    : 12/301321
DATED              : March 6, 2012
INVENTOR(S)        : Okuyama et al.

It is certified that error appears in the above-identified patent and that said Letters Patent is hereby corrected as shown below:

Front page, (57) Abstract, line 5: "aAO.bEuO.DO.cSiO$_2$" should read -- aAO•bEuO•DO•cSiO$_2$ --.
Column 1, line 48: "aAO.bEuO.DO.cSiO$_2$" should read -- aAO•bEuO•DO•cSiO$_2$ --.
Column 2, line 37; "aAO.bEuO.DO.cSiO$_2$" should read -- aAO•bEuO•DO•cSiO$_2$ --.
Column 8, line 31 (claim 1): "aAO.bEuO.DO.cSiO$_2$" should read -- aAO•bEuO•DO•cSiO$_2$ --.

Signed and Sealed this
Fourteenth Day of August, 2012

David J. Kappos
*Director of the United States Patent and Trademark Office*